US006815863B1

(12) United States Patent
Jack et al.

(10) Patent No.: US 6,815,863 B1
(45) Date of Patent: Nov. 9, 2004

(54) INDUCTION MACHINE STATOR

(75) Inventors: Alan G. Jack, Northumberland (GB);
Barrie Mecrow, Tyne and Wear (GB);
Öystein Krogen, Höganäs (SE)

(73) Assignee: Höganäs AB, Höganäs (SE)

( * ) Notice: Subject to any disclaimer, the term of this patent is extended or adjusted under 35 U.S.C. 154(b) by 0 days.

(21) Appl. No.: 09/684,988

(22) Filed: Oct. 10, 2000

Related U.S. Application Data

(63) Continuation of application No. PCT/SE99/00614, filed on Apr. 19, 1999.

(30) Foreign Application Priority Data

Apr. 21, 1998 (SE) ................................. 9801401

(51) Int. Cl.$^7$ ................. H02K 17/44; H02K 19/38; H02K 47/00; H02K 16/02; H02K 1/12
(52) U.S. Cl. ................... 310/254; 310/112; 310/114
(58) Field of Search ................ 310/113, 114, 310/254, 269; 300/112, 114, 49 R, 166, 156, 185, 215, 214, 217, 218; 318/646, 158, 727–832

(56) References Cited

U.S. PATENT DOCUMENTS

| | | | | |
|---|---|---|---|---|
| 2,598,623 A | * | 5/1952 | Vacha | 310/216 |
| 2,797,346 A | * | 6/1957 | Ranseen | 310/46 |
| 2,872,602 A | * | 2/1959 | Herr | 310/111 |
| 2,944,171 A | * | 7/1960 | Alger | 310/211 |
| 3,447,012 A | * | 5/1969 | Staebler | 310/218 |
| 3,809,990 A | * | 5/1974 | Kuo et al. | 318/696 |
| 4,229,689 A | * | 10/1980 | Nickoladze | 322/32 |
| 4,371,802 A | | 2/1983 | Morrill | 310/166 |
| 4,777,396 A | * | 10/1988 | Ito et al. | 310/156 |
| 4,947,065 A | | 8/1990 | Ward et al. | |
| 5,220,228 A | * | 6/1993 | Sibata | 310/254 |
| 5,260,620 A | * | 11/1993 | Morrill | 310/185 |
| 5,272,401 A | * | 12/1993 | Lin | 310/49 R |
| 5,331,245 A | * | 7/1994 | Burgbacher et al. | 310/186 |
| 5,345,133 A | * | 9/1994 | Satake | 310/266 |
| 5,652,493 A | * | 7/1997 | Hendershot, Jr. | 310/138 |
| RE35,763 E | * | 4/1998 | Burgbacher | 310/51 |
| 5,773,908 A | | 6/1998 | Stephens et al. | 310/254 |
| 5,808,392 A | * | 9/1998 | Sakai et al. | 310/214 |
| 5,990,588 A | * | 11/1999 | Kliman et al. | 310/86 |
| 5,996,209 A | * | 12/1999 | Molnar et al. | 29/596 |
| 6,031,304 A | * | 2/2000 | Suzuki et al. | 310/157 |
| 6,049,153 A | * | 4/2000 | Nishiyama et al. | 310/214 |
| 6,072,303 A | * | 6/2000 | Nickoladze et al. | 322/20 |
| 6,104,117 A | * | 8/2000 | Nakamura et al. | 310/254 |
| 6,121,712 A | * | 9/2000 | Sakamoto | 310/254 |
| 6,129,760 A | * | 10/2000 | Fedorov et al. | 310/254 |
| 6,181,041 B1 | * | 1/2001 | Nose | 310/164 |
| 6,194,806 B1 | * | 2/2001 | Suzuki et al. | 310/269 |
| 6,262,507 B1 | * | 7/2001 | Sato et al. | 29/596 |
| 6,300,702 B1 | * | 10/2001 | Jack et al. | 310/216 |

FOREIGN PATENT DOCUMENTS

| | | | |
|---|---|---|---|
| EP | 0 394 526 A1 | | 10/1990 |
| EP | 0 653 827 A1 | | 5/1995 |
| JP | 406245456 A | * | 9/1994 |
| JP | 7298578 | | 11/1995 |
| TW | 111014 | | 4/1989 |
| TW | 1111700 | | 4/1989 |
| TW | 280964 | | 7/1996 |
| WO | WO 95/12912 | | 5/1995 |

* cited by examiner

Primary Examiner—Nicholas Ponomarenko
Assistant Examiner—Julio Gonzalez
(74) Attorney, Agent, or Firm—Burns, Doane, Swecker & Mathis, L.L.P.

(57) ABSTRACT

A stator (1) for an electrical induction machine comprises at least two stator sections (2, 3) at two different axial positions, each section having a plurality of circumferentially separated, radially extending teeth (6, 7) and each tooth having a single winding. The stator sections are mutually phase-shifted so as to reduce the effect of other harmonics than the working harmonics. In a stator having two separated stator sections, these are physically phase-shifted by 180° electrical±an angle related to skew, and then have their electrical supplies also shifted by 180° electrical.

21 Claims, 4 Drawing Sheets

INDUCTION MACHINE STATOR

This is a continuation of International Application No. PCT/SE99/00614, filed Apr. 19, 1999, and claims priority for the filing of Swedish Application No. 9801401-2, filed Apr. 21, 1998.

TECHNICAL FIELD

The present invention is generally related to electrical induction machines and more specifically to a stator for an induction machine.

BACKGROUND OF THE INVENTION AND PRIOR ART

Conventionally, the stator assembly of an electrical machine has a stator core formed of a stack of steel laminations. As an alternative to the use of steel laminations, the stator core may be formed from iron powder, as exemplified by U.S. Pat. No. 4,947,065 disclosing a stator moulded in one-piece, and by International Patent Application WO95/12912 disclosing a stator comprising a plurality of separate and substantially identical parts.

By its very nature any compacted, non-sintered material will not be fully dense. This means that soft iron powder currently available will have a permeability that is lower than the permeability obtainable with steel laminations. However, magnetic powder composites could offer advantages such as isotropic magnetic behaviour, reduction in iron losses at high frequencies, improved thermal characteristics and flexible design and assembly.

The use of single tooth geometry could give rise to large benefits when it comes to thermal and manufacturing properties of electrical machines. However, the single tooth winding geometry will also give rise to a different spectrum of harmonics of the armature field, compared to a standard winding arrangement. These higher order fields, which may travel around the airgap at different speed compared to the working harmonics, will induce eddy currents in the stator and the rotor.

In a synchronous machine, these higher order fields have substantially no influence on the torque, while in an induction machine they will produce additional torque at synchronous speeds different to the main speed and thereby result in reductions and/or dips in the torque-speed characteristic and extra rotor losses.

In a traditional induction machine, this is avoided by distributing the windings in slots, but this is not possible if one wants to have a polyphase winding made from single tooth sections.

JP-A-7298578 discloses an alternative for the single tooth winding geometry. More specifically, the stator is divided into two parts along its axis and the two parts are shifted an angle of 0–120° electrical, preferably 90° electrical. However, this shift only cancels the second harmonics and therefore further measures are necessary. According to this reference, a fixed tooth width (or slot opening width) to tooth pitch ratio is necessary to cancel higher order even harmonics. This results in less geometrical freedom for the motor design. The conventional use of slot skew to reduce cogging also will be affected by the constricted motor design parameters.

SUMMARY

One object of the present invention is to provide a stator for an electrical induction machine which benefits from the use of the single tooth geometry and at the same time corrects reductions and/or dips in the torque-speed characteristic and the extra rotor losses without resort to the features disclosed in JP-A-7298578.

This object is achieved by a stator as claimed in the appending claim 1. Thus, by dividing the stator into an even number of stator sections at different axial positions, each section having a plurality of circumferentially separated, radially oriented teeth and each tooth having a single winding, the effect of other harmonics than the working harmonics may be reduced in that the stator sections are mutually phase shifted by substantially 360°/n electrical±an angle related to skew and in that n/2 of the stator sections have their electrical supplies shifted by 180° electrical.

The effect produced by several stator sections on a single rotor is substantially the same as a distributed winding. This leads to the cancelling of a large fraction of the higher harmonics while keeping the benefits of single tooth windings, i.e. high slot fill factor, and simple manufacturing and assembling.

The two stator sections will only be separated by a small air-gap of the order of the teeth opening, preferably obtained by making each stator section at least partly from a magnetic powder. The stator sections should at least have different axial positions; i.e. they might even be juxtaposed. Each stator section will contain the same harmonics, but the phase shifting of them will, seen from the rotor conductor bars, cancel a large fraction of unwanted higher order harmonics.

DESCRIPTION OF THE PREFERRED EMBODIMENT

Figure 1:
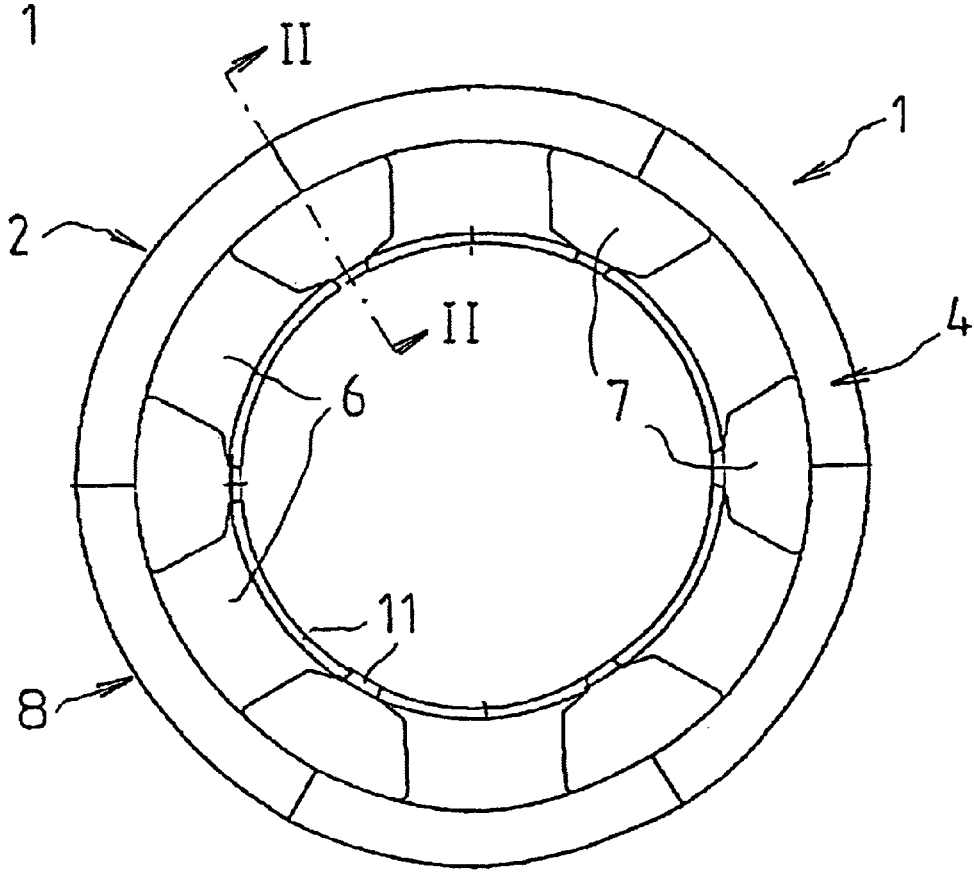
FIG. 1 is an end view of a stator for a 4-pole 3-phase induction motor according to one embodiment of the present invention.
Figure 2:
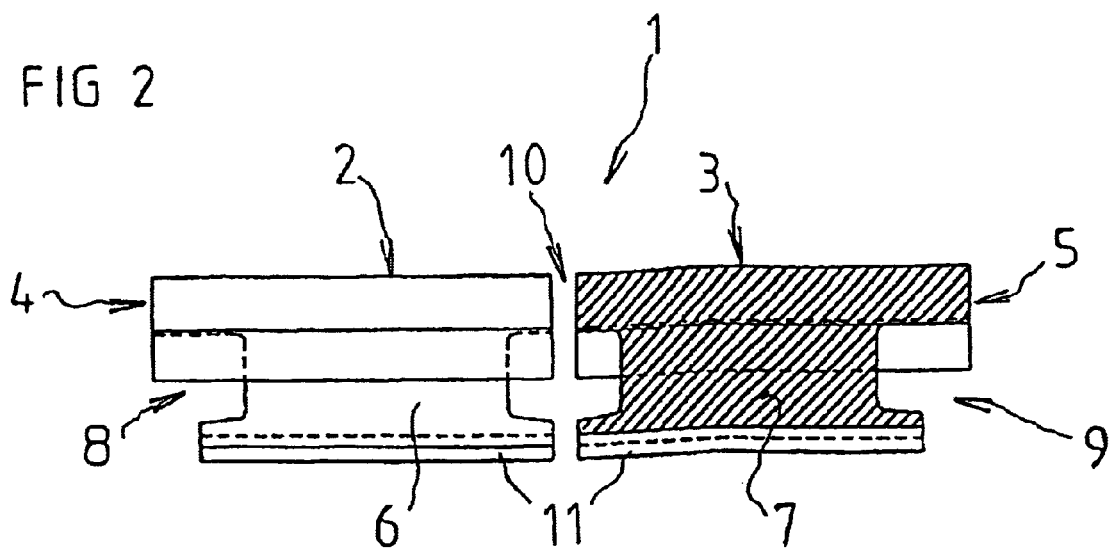
FIG. 2 is an axial cross-sectional view along lines II—II in FIG. 1.

Referring to FIGS. 1 and 2, a stator 1 of an induction motor is illustrated as having two axially separated stator sections 2 and 3. Each one of the stator sections has a yoke section 4 and 5, respectively; adjoining six circumferentially separated, radially extending teeth 6 and 7, respectively.

More precisely, each tooth 6 and an adjoining part of the corresponding yoke section 4 form a separate unit or segment 8. Similarly, each tooth 7 and an adjoining part of the corresponding yoke section 5 form a separate unit or segment 9.

Figure 3:
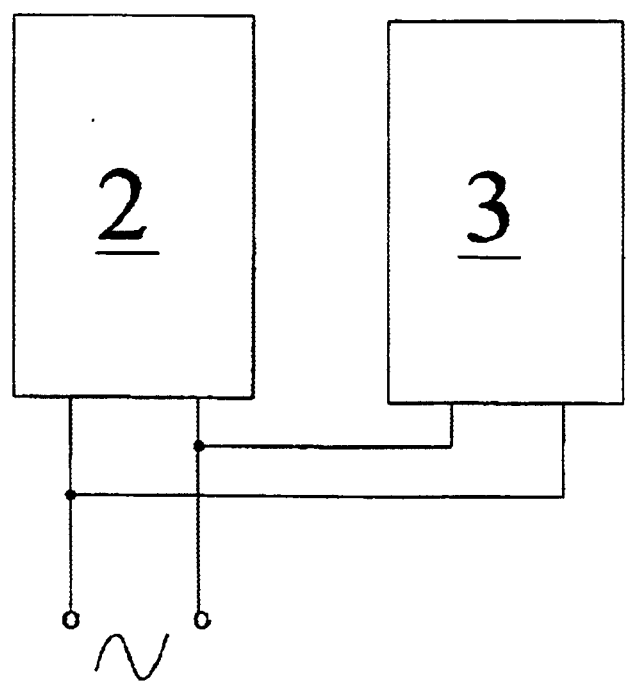
FIG. 3 illustrates the connection of the power supply to the stator sections.
Figure 4:
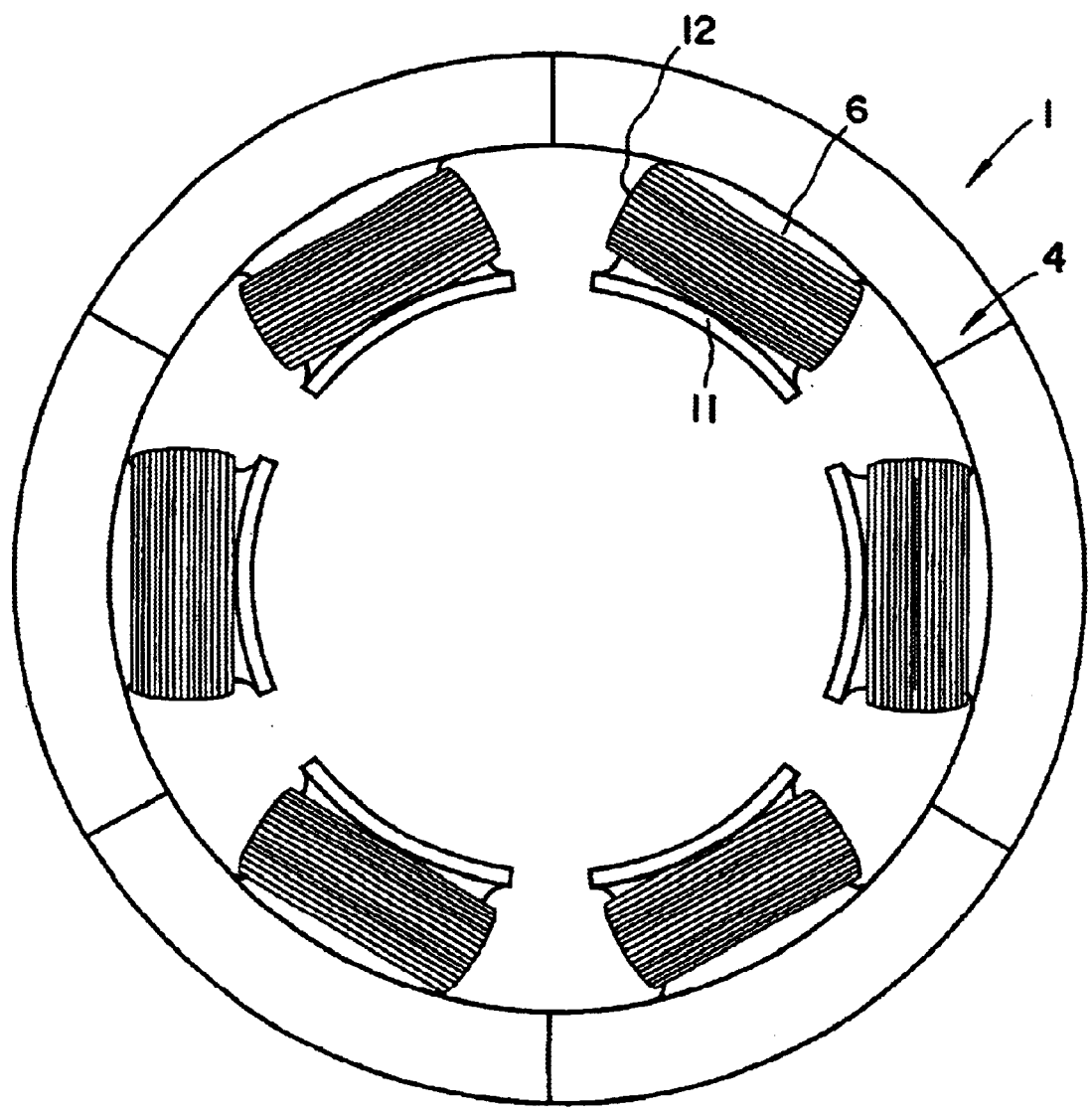
FIG. 4 illustrates a stator with a single winding on each tooth.
Figure 5:
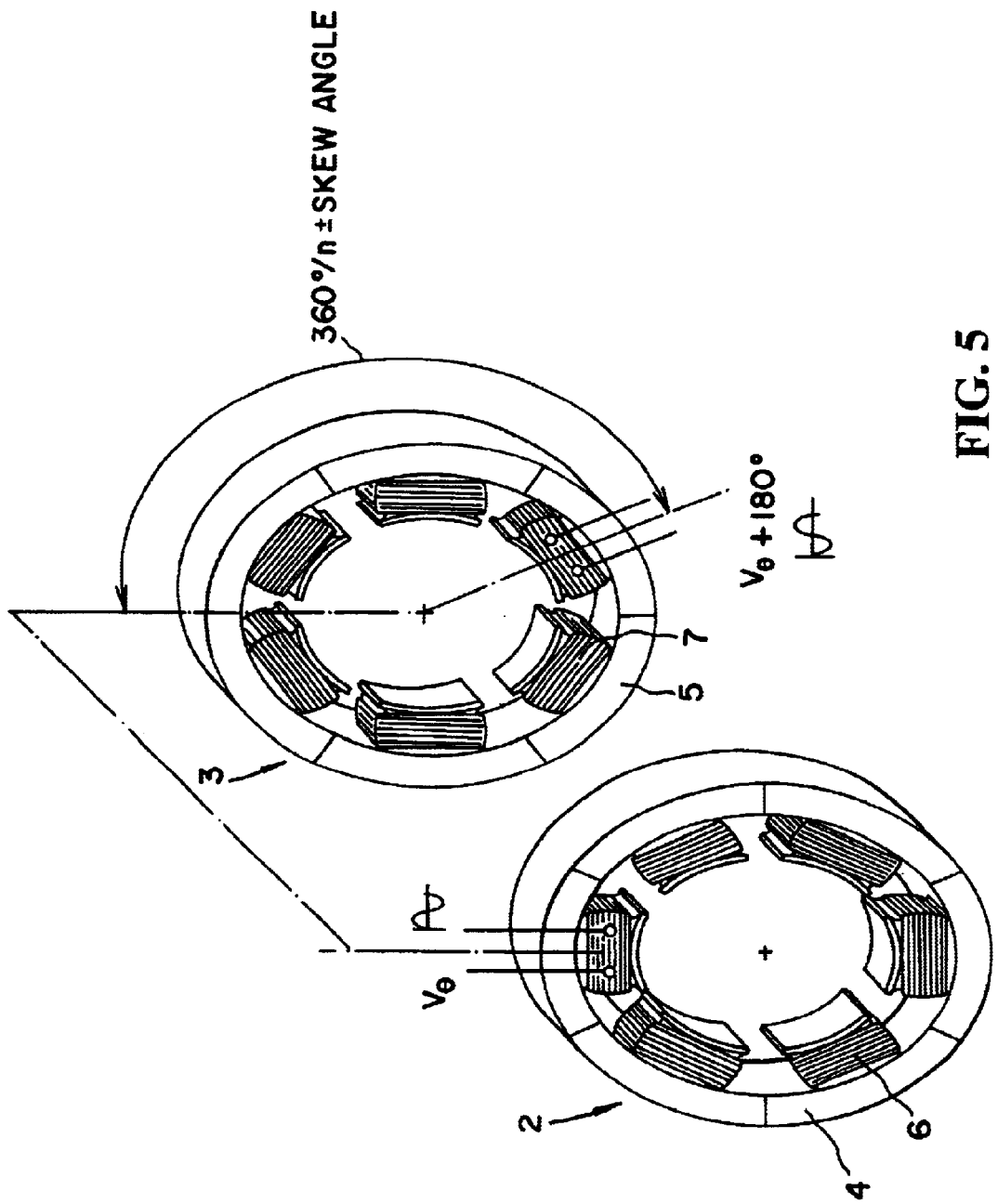
FIG. 5 is a schematic exploded view of two stator sections of an induction motor according to an embodiment of the present invention.

The yoke sections 4 and 5 are physically phase shifted by 180°electrical ± an angle that is related to skew (not shown). Their electrical supplies are also shifted by 180° electrical. FIG. 3 illustrates the electrical supplies connected to stator sections 1 and 2 and mutually phase shifted 180° electrical. Further, the stator sections 2 and 3 are separated by small air gap 10 so as to reduce the mutual influence of the magnetic fields in the two stator sections 2 and 3.

As a result, each stator section will contain the same harmonics, but the phase shifting of them will, as seen from the single rotor (not illustrated), cancel a large fraction of the unwanted higher order harmonics.

Assembling each of the stator sections 2 and 3 from the separate units 8 and 9, respectively, permits an easy winding of each unit of the stator 1.

The multiple separate units 8 and 9 (twelve in the current embodiment) are made of a soft magnetic powder composite material which is filled into a die, pressed to a desired shape and then heat treated at a relatively low temperature so as not to destroy the necessary insulating layer between the powder particles. This means that volume production of the separate units 8 and 9 is possible and results in no material waste and a finished pressed unit with high tolerances and little or no machining being required.

As shown for one unit 8 and one unit 9 in FIG. 2, the axial length of each tooth 6, 7 is less than the axial length of the adjoining part of the yoke section 4, 5. The extension of the yoke sections 4, 5 axially past the teeth 6, 7 is asymmetric on the two axial sides thereof and increases the active length of the core and reduces the iron losses and magnetising current such that a more efficient machine is provided. Further, the heat transfer from the windings to the stator is improved by the axial extensions of the yoke adjoining the coil turn parts outside the winding slots.

The above described design may be used for reducing the total winding length and thereby reduce the dimensions of the electrical machine with maintained performance.

As illustrated in the drawings, the tips 11 of the teeth 6 and 7 also extend axially past the main part of the teeth on both axial sides thereof. The extension of the teeth tips allows a reduction in the air gap reluctance which produces a corresponding reduction in magnetising current. This offsets the deleterious effects of the relatively low permeability of powder iron.

A further advantage of using powder material is that the sectional tooth profile may be rounded or oval such that sharp bending of the coil turns is eliminated and the risk of penetration of the insulation at the corners is reduced. This allows thinner insulation to be used resulting in a substantial thermal benefit. The winding arrangement may comprise a non-overlapping winding on each tooth that simplifies the winding operation and allows very high packing factors to be achieved.

It should be noted that the rotor (not shown in FIGS. 1 and 2) of the induction motor preferably is of conventional design.

While only one embodiment of the present invention is described above, it is obvious to those skilled in the art that the several modifications are possible without departing from the spirit of the present invention.

Thus, the invention can be used in machines having an outer rotor instead of the exemplified inner rotor.

Further, the material of the stator may comprise laminations or a powder material combined with other materials, e.g. laminations, or the stator may be made by casting.

What is claimed:

1. A stator for an electrical induction machine, comprising an even number n of stator sections (2, 3) at different axial positions, each section having a plurality of circumferentially separated, radially extending teeth (6, 7) and each tooth having a single winding, wherein the stator sections are mutually phase shifted by substantially 360°/n electrical±an angle related to skew, and wherein each of the stator sections is arranged to receive electricity from an electrical supply such that a first set of n/2 of the stator sections will receive electricity that is shifted by 180° electrical relative to electricity received by a second set of n/2 of the stator sections.

2. A stator as claimed in claim 1, wherein the even number n is 2, the stator sections being physically phase shifted by substantially 180° electrical±an angle related to skew, and the two stator sections have their electrical supplies shifted by 180° electrical.

3. A stator as claimed in claim 1, wherein each stator section has the same number of teeth.

4. A stator as claimed in claim 1, wherein each stator section, at least partly, is made of a magnetic powder.

5. A stator as claimed in claim 4, wherein each stator section is made of several separate units, each unit comprising a tooth and an adjoining part of a yoke of the stator.

6. A stator as claimed in claim 5, wherein each unit also comprises one of said single windings.

7. A stator s claimed in claim 5, wherein the adjoining parts of the yoke extend axially past the teeth at least at one of the axial sides thereof.

8. A stator as claimed in claim 1, wherein the tips of the teeth extend axially past the main part of the teeth at least at one of the axial sides thereof.

9. A stator as claimed in claim 1, wherein each tooth has a rounded profile.

10. A stator as claimed in claim 1, wherein the stator sections are separated axially.

11. An electrical induction machine having a rotor and a stator, wherein the stator comprises an even number n of stator sections (2, 3) at different axial positions, each section having a plurality of circumferentially separated, radially extending teeth (6, 7) and each tooth having a single winding, wherein the stator sections are mutually phase shifted by substantially 360/n±an angle related to skew and wherein each of the stator sections is arranged to receive electricity from an electrical supply such that a first set of n/2 of the stator sections have their electrical supplies shifter by 180° electrical relative to electricity received by a second set of n/2 of the stator sections.

12. A stator as claimed in claim 2, wherein each stator section has the same number of teeth.

13. A stator as claimed in claim 2, wherein each stator section, at least partly, is made of a magnetic powder.

14. A stator as claimed in claim 3, wherein each stator section, at least partly, is made of a magnetic powder.

15. A stator as claimed in claim 12, wherein each stator section, at least partly, is made of a magnetic powder.

16. A stator as claimed in claim 6, wherein the adjoining parts of the yoke extend axially past the teeth at least at one of the axial sides thereof.

17. A stator as claimed in claim 2, wherein the tips of the teeth extend axially past the main part of the teeth at least at one of the axial sides thereof.

18. A stator as claimed in claim 3, wherein the tips of the teeth extend axially past the main part of the teeth at least at one of the axial sides thereof.

19. A stator as claimed in claim 2, wherein each tooth has a rounded profile.

20. A stator as claimed in claim 3, wherein each tooth has a rounded profile.

21. A stator as claimed in claim 2, wherein the stator sections are separated axially.

* * * * *